US007022807B2

(12) United States Patent
Okamoto et al.

(10) Patent No.: US 7,022,807 B2
(45) Date of Patent: Apr. 4, 2006

(54) LIQUID-CRYSTALLINE POLYESTER SOLUTION COMPOSITION

(75) Inventors: Satoshi Okamoto, Tsukuba (JP); Shinji Ohtomo, Tsukuba (JP); Shiro Katagiri, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/824,475

(22) Filed: Apr. 15, 2004

(65) Prior Publication Data

US 2004/0210032 A1 Oct. 21, 2004

(30) Foreign Application Priority Data

Apr. 17, 2003 (JP) ............................ 2003-112510

(51) Int. Cl.
*C08G 63/00* (2006.01)

(52) U.S. Cl. ........................ 528/308; 428/64; 528/272; 528/288

(58) Field of Classification Search .................. 428/64; 528/272, 288, 308
See application file for complete search history.

(56) References Cited

U.S. PATENT DOCUMENTS

| | | | | |
|---|---|---|---|---|
| 6,808,766 | B1 * | 10/2004 | Miyama et al. | 428/1.25 |
| 2004/0091686 | A1 | 5/2004 | Okamoto et al. | |

FOREIGN PATENT DOCUMENTS

| | | | |
|---|---|---|---|
| JP | 62-64832 | A | 3/1987 |
| JP | 2002-114894 | A | 4/2002 |

* cited by examiner

*Primary Examiner*—Terressa Boykin
(74) *Attorney, Agent, or Firm*—Sughrue Mion, PLLC

(57) ABSTRACT

A liquid-crystalline polyester solution composition comprises an aprotic solvent and liquid-crystalline polyester. The liquid-crystalline polyester includes at least one of repeating unit selected from the group consisting of a repeating unit derived from aromatic diamine, a repeating unit derived from aromatic amine having a hydroxyl group and a repeating unit derived from aromatic amino acid, in from 10 to 35 mol % in the liquid-crystalline polyester.

9 Claims, No Drawings

LIQUID-CRYSTALLINE POLYESTER SOLUTION COMPOSITION

FIELD OF THE INVENTION

The present invention relates to a liquid-crystalline polyester solution composition.

BACKGROUND OF THE INVENTION

Liquid-crystalline polyester which is excellent in dielectric property at high-frequency and low water absorption, has received much attention as a material used for electronics substrate. In a film produced by extruding liquid-crystalline polyester, molecular chain of the polyester is significantly oriented along the extruding direction. Due to the orientation, the mechanical strength of the film is anisotropic in the lateral direction (orthogonal to the extruding direction) comparing with the longitudinal direction (extruding direction).

A liquid-crystalline polyester film with small anisotropy can be produced by applying a solution composition containing liquid-crystalline polyester and trifluoroacetic acid over a support and remove the solvent from the spread JP 62-64832 A the solvents used in JP 62-64832 A may be highly corrosive and difficult in handling.

JP 2002-114894 A discloses compositions of liquid-crystalline polyester solution containing solvents such as p-chlorophenol as a low corrosive solvent. It is still desired to develop a solution composition that contains a further low corrosive solvent and easy in handling, and provide a liquid-crystalline polyester film with small anisotropic mechanical strength.

SUMMARY OF THE INVENTION

As a result of earnest studies for finding a liquid-crystalline polyester solution composition which is low corrosive and easy in handing, the present inventors have found that a solution composition which comprises an aprotic solvent and liquid-crystalline polyester comprising a repeating unit derived from an aromatic amine derivative provides a liquid-crystalline polyester film with small anisotropic mechanical strength.

That is, the liquid-crystalline polyester solution composition of the present invention comprises an aprotic solvent and liquid-crystalline polyester comprising at least one of repeating unit selected from the group consisting of a repeating unit derived from aromatic diamine, a repeating unit derived from aromatic amine having a hydroxyl group, and a repeating unit derived from aromatic amino acid, in from 10 to 35 mol % in the liquid-crystalline polyester.

DESCRIPTION OF PREFERRED EMBODIMENTS

The liquid-crystalline polyester used in the present invention includes a repeating unit derived from aromatic diamine, a repeating unit derived from an aromatic amine having a hydroxyl group or a repeating unit derived from aromatic amino acid, or two or more of these repeating units.

The content of the repeating unit mentioned above is from 10 to 35 mol % of the total of all repeating units composing the liquid-crystalline polyester. When liquid-crystalline polyester includes two or more of the repeating units mentioned above, the total thereof is from 10 to 35 mol %.

The aromatic liquid-crystalline polyester used in the present invention is a polyester called thermotropic liquid-crystalline polyester, and shows optical anisotropy in melting at temperatures of 450° C. or less.

The preferable liquid-crystalline polyester may comprise repeating units represented by formulae (1), (2) and (3) below. The content of each repeating units represented by formulae (1), (2) and (3) is preferably from 30 to 80 mol %, from 35 to 10 mol % and from 35 to 10 mol %, respectively in the liquid-crystalline polyester:

$$—O—Ar_1—CO— \quad (1)$$

$$—CO—Ar_2—CO— \quad (2)$$

$$—X—Ar_3—Y \quad (3)$$

In the above formulae, $Ar_1$ represents 1,4-phenylene, 2,6-naphthalene or 4,4'-biphenylene, $Ar_2$ represents 1,4-phenylene, 1,3-phenylene or 2,6-naphthalene, $Ar_3$ represents 1,4-phenylene or 1,3-phenylene, X represents —NH—, and Y represents —O— or —NH—.

The repeating unit (1) is a repeating unit derived from aromatic hydroxycarboxylic acids, the repeating unit (2) is a repeating unit derived from aromatic dicarboxylic acids, and the repeating unit (3) is a repeating unit derived from aromatic diamines, aromatic amines having a hydroxyl group or aromatic amino acids. In place of such aromatic hydroxycarboxylic acids, aromatic dicarboxylic acids, aromatic diamines, aromatic amines having a hydroxyl group or aromatic amino acids, the liquid-crystalline polyester including the repeating units mentioned above may be produced by using ester formable derivatives thereof such as derivatives having ester forming property.

The ester formable derivatives of a compound having a carboxylic acid group may include, for example, those in which a carboxyl group is present in the form of an acid chloride or an acid anhydride so as to promote an ester formation reaction with high reactivity, or those in which a carboxyl group forms an ester with alcohols, ethylene glycol and the like so that a polyester is formed by a transesterification reaction.

The ester formable derivatives of a compound having an aromatic hydroxyl group may include, for example, those in which an aromatic hydroxyl group forms an ester with carboxylic acids so that polyester is formed by a transesterification reaction.

Examples of ester forming derivatives of a compound having an amino group may include, for example, those in which an amino group forms an ester with carboxylic acids so that polyester is produced by transesterification reaction.

Examples of the repeating units of the liquid-crystalline polyester used in the present invention include the following repeating units.

Examples of the repeating unit represent by formula (1) include repeating units derived from p-hydroxybenzoic acid, 2-hydroxy-6-naphthoic acid and 4-hydroxy-4'-biphenylcarboxylic acid. Two or more of these repeating units may be included in the liquid-crystalline polyester. Among above repeating units, a preferable repeating unit is the repeating unit derived from 2-hydroxy-6-naphthoic acid.

The content of the repeating unit (1) is preferably from 30 to 80 mol %, more preferably 40 to 70 mol %, further more preferably 45 to 65 mol %, of the total of the repeating units composing the liquid crystalline polyester. If the content of the repeating unit (1) exceeds 80 mol %, the solubility in the solvent described later may decrease. If it is less than 30 mol %, liquid crystallinity may not be exhibited.

Examples of the repeating unit represented by formula (2) include repeating units derived from terephthalic acid, isophthalic acid and 2,6-naphthalene dicarboxylic acid. Two or more of these repeating units may be included in the liquid crystalline polyester. Among above repeating units a preferable repeating unit is the repeating unit derived from isophthalic acid from the viewpoint of the solubility in the solvent described later.

The content of the repeating unit (2) is preferably from 35 to 10 mol %, more preferably 30 to 15 mol %, further more preferably 27.5 to 17.5 mol %, of the total of the repeating units composing the liquid crystalline polyester. If the content of the repeating unit (2) exceeds 35 mol %, the liquid crystallinity may decreased. If it is less than 10 mol %, the solubility in the solvent described later may decrease.

Examples of the repeating unit represented by formula (3) include repeating units derived from 3-aminophenol, 4-aminophenol, 1,4-phenylenediamine, and 1,3-phenylenediamine. Two or more of these structural units may be included in the liquid-crystalline polyester. Among above repeating units, a preferable repeating unit is the repeating unit derived from 4-aminophenol from the viewpoint of its reactivity.

The content of the repeating unit (3) is preferably from 35 to 10 mol %, more preferably 30 to 15 mol %, further more preferably 27.5 to 17.5 mol %, of the total of the repeating units composing the liquid-crystalline polyester. If the content of the repeating unit (3) exceeds 35 mol %, the liquid crystallinity may be degrade. If it is less than 10 mol %, the solubility in the solvent described later may decrease.

The content of the repeating unit (3) is preferably substantially equal to that of the repeating unit (2). Alternatively, from the viewpoint of controlling the degree of polymerization of the obtained liquid-crystalline polyester, it is preferable that the content of the repeating unit (3) is in the range of between 10 mol % less than and 10 mol % more than that of the repeating unit (2).

The method of producing the aromatic liquid-crystalline polyester used in the present invention is not particularly limited and may include, for example, a method in which a hydroxyl group or amino group contained in aromatic hydroxycarboxylic acid providing the repeating unit (1), aromatic diamines, aromatic amines having a hydroxyl group or aromatic amino acids, those which provide a repeating unit (3), are acylated with an excess amount of a fatty acid anhydride to obtain an acylated compound, and the aromatic liquid-crystalline polyester is produced by transesterifaction between the acylated compound and aromatic dicarboxylic acid providing the repeating unit (2) As the acylated compound, fatty acid esters obtained by previous acylation may also be used. (JP Nos. 2002-220444A and 2002-146003A).

The use amount of a fatty acid anhydride in acylation is preferably from 1.05 to 1.2 times equivalent to that of the phenolic hydroxyl group, more preferably from 1.05 to 1.1 times equivalent to that of the phenolic hydroxyl group. If the adding amount of fatty acid anhydride is less than 1.0 equivalents of the phenolic hydroxyl group, sublimation of acylated compound, aromatic hydroxycarboxylic acids and aromatic dicarboxylic acids may occur during transesterification (polycondensation) and clogging of the piping of such as reaction vessel may occur. If the adding amount of fatty acid anhydride is more than 1.2 equivalents, coloring of resultant aromatic liquid-crystalline polyester may be more significant.

The acylation reaction is preferably conducted at about 130 to about 180° C. for about 5 minutes to about 10 hours, more preferably conducted at about 140 to about 160° C. for about 10 minutes to about 3 hours.

The fatty acid anhydride used in the acylation reaction is not particularly restricted, and include, for example, acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride and the like, and these may be used in admixture of two or more. From the viewpoints of its price and easy handling, acetic anhydride, propionic anhydride, butyric anhydride and isobutyric anhydride are preferable, and acetic anhydride is more preferably.

In transesterification, it is preferable that the amount of an acyl group in an acylated compound is 0.8 to 1.2 times equivalent to that of a carboxyl group.

Transesterification is preferably conducted while raising temperature from about 130 to about 400° C. at a rate of 0.1 to 50° C./min, and more preferably conducted while raising temperature from about 150 to about 350° C. at a rate of 0.3 to 5° C./min.

In transesterification of a carboxylic acid with a ester of fatty acid obtained by acylation, it is preferred that a fatty acid generated as a by-product and unreacted fatty acid anhydride are distilled off by means of a usual method such as distillation for the purpose of shifting the equilibrium.

The acylation reaction and transesterification may also be conducted in the presence of a catalyst. As the catalyst, those conventionally known as a catalyst for polymerization of a polyester can be used, and examples thereof include metal salt catalysts such as magnesium acetate, stannous acetate, tetrabutyl titanate, lead acetate, sodium acetate, potassium acetate, antimony trioxide and the like, organic compound catalysts such as N,N-dimethylaminopyridine, N-methylimidazole and the like.

Among the above catalysts, heterocyclic compounds containing two or more nitrogen atoms such as N,N-dimethylaminopyridine and N-methylimidazole are preferable (JP No. 2002-146003).

These catalysts are usually charged at the time of charging monomers, and are not necessarily removed after acylation, and when the catalysts are not removed, they can be used for transesterification.

Though polycondensation by transesterification is usually conducted by melt polymerization, melt polymerization and solid-phase polymerization may be used together. It is preferable, in solid-phase polymerization, that a polymer is extracted from a melt polymerization process, then, ground into powder form or flake form, and subjected to a known solid-phase polymerization method. For example, a method for solid-phase polymerization include a method in which heat-treatment is conducted in solid phase at about 20 to about 350° C. under an inert atmosphere such as nitrogen for 1 to 30 hours. Solid-phase polymerization may be conducted while stirring, or conducted in static condition without stirring. Further, melt polymerization and solid-phase polymerization may also be conducted in the same reaction vessel by providing a suitable stirring mechanism. After solid-phase polymerization, the resulted aromatic liquid-crystalline polyester can be pelletized and molded by known methods.

Production of aromatic liquid-crystalline polyester can be conducted using, for example, a batch-wise apparatus, continuous apparatus and the like.

Conventional fillers, additives and the like may be added to the liquid-crystalline polyester.

Examples of fillers include: organic fillers such as epoxy resin powder, melamine resin powder, urine resin powder benzoguanamine resin powder and styrene resin; and inorganic fillers such as silica, alumina, titanium oxide, zirconia, kaoline, calcium carbonate and calcium phosphate.

Examples of additives include known coupling agents, anti-precipitation agents, UV absorbers and thermal stabilizers.

One or more kinds of thermoplastic resins may also added to the liquid-crystalline polyester. Such thermoplastic resins include polypropylene, polyamide, polyphenylene sulfide, polyether ketone, polycarbonate, polyether sulfone, polyphenyl ether and modified polymer thereof, and polyether imide, elastomers such as a copolymer of glycidyl methacrylate and ethylene, and the like.

The solvent used for the liquid-crystalline polyester solution composition of the present invention is an aprotic solvent. The amount of the aprotic solvent used is not limited as far as it can dissolve the liquid crystalline polyester, and may be appropriately chosen according to the use. The preferable amount of the liquid crystalline polyester is from 0.01 to 100 parts by weight with respect to 100 parts by weight of the aprotic solvent. If the amount of the liquid-crystalline polyester is less than 0.01 parts by weight, the viscosity of the solution composition may be too low to uniformly apply. If it exceeds 100 parts by weight, the viscosity may be too high. From the viewpoint of the workability and the economy, the amount of the liquid-crystalline polyester is preferably not less than 1 parts by weight, more preferably not less than 2 parts by weight and not more than 50 parts by weight, more preferably not more than 40 parts by weight, with respect to 100 parts by weight of the aprotic solvent.

Examples of the aprotic solvent include: halogen solvents such as 1-chlorobutane, chlorobenzene, 1,1-dichloroethane, 1,2-dichloroethane, chloroform and 1,1,2,2-tetrachloroethane; ether solvents such as diethyl ether, tetrahydrofuran and 1,4-dioxane; ketone solvents such as acetone and cyclohexanone; ester solvents such as ethyl acetate; lactone solvents such as γ-butyrolactone; carbonate solvents such as ethylene carbonate and propylene carbonate; amine solvents such as triethylamine and pyridine; nitrile solvents such as acetonitrile and succinonitrile; amide solvents such as N,N'-dimethyl formamide, N,N'-dimethyl acetoamide, tetramethylurea and N-methylpyrrolidone; nitro solvents such as nitromethane and nitrobenzene; sulfide solvents such as dimethylsulfoxide and sulfolane; and phosphate solvents such as hexarnethylphosphoramide and tri-n-butylphosphate.

Among the above solvents, solvents free from halogen atoms are preferably used in consideration of the influence to the environment, and solvents having a dipole moment of from 3 to 5 are preferably used from the viewpoint of the solubility. Preferable solvent having a dipole moment of from 3 to 5 include amide solvents such as N,N'-dimethyl formamide, N,N'-dimethyl acetoamide, tetramethylurea and N-methylpyrrolidone and lactone solvents such as γ-butyrolactone, and more preferable one is, N,N'-dimethyl formamide, N,N'-dimethyl acetoamide and N-methylpyrrolidone.

The liquid-crystalline polyester film can be produced in the following manner. The liquid-crystalline polyester is dissolved in an aprotic solvent to obtain a solution composition. The solution composition is filtered with a filter or the like to remove fine foreign matters contained in the solution composition, if necessary. The solution composition is then spread over a support to be flat and uniform by any of various methods such as roller coating, dip coating, spray coating, spinner coating, curtain coating, slot coating and screen printing. After the spreading, the aprotic solvent is removed.

The method of removing the aprotic solvent is not specifically limited, and the method of evaporating the aprotic solvent is preferable one. The evaporation of the solvent may be made by heating, decompression, ventilation and the like. Among above methods, evaporation by heating is preferable from the viewpoint of the production efficiency and the easiness in handling. Evaporation by heating under ventilation is more preferable one. This heating under ventilation preferably includes the step of preliminary drying between about 60 and about 200° C. for from about 10 minutes to about 2 hours and the step of heat treatment between about 200 and about 400° C. for from about 30 minutes to about 5 hours.

The thickness of the liquid-crystalline polyester film produced in the manner described above is not specifically limited, and is preferably from about 0.5 to about 500 μm from the viewpoint of forming the film and the mechanical property, more preferably 1 to 100 μm from the viewpoint of the easiness in handling.

The liquid-crystalline polyester solution composition of the present invention is low in corrosiveness and easy in handling. The mechanical property of the film produced from this solution composition is small anisotropic between the longitudinal direction (spread direction) and the lateral direction (direction orthogonal to the spread direction), exhibiting excellent mechanical strength, and is also excellent in the performance such as at the high-frequency and the low water absorption that are intrinsically possessed by the liquid-crystalline polyester itself. Such a film can be suitably used as films for electronic components such as printed wiring boards.

Note that the word "film" as used herein includes various articles in the forms of sheet being from very thin to thick and, not only an articles in the forms of sheet, but also an articles in the forms of containers such as bottoms and the like.

EXAMPLES

Hereinafter, the present invention will be described in detail. The present invention is not limited to the following examples.

Production Example 1

In a reactor equipped with a stirrer, a torque meter, a nitrogen gas feed tube, a thermometer and a reflux condenser 941 g (5.0 moles) of 2-hydroxy-6-naphthoic acid, 273 g (2.5 moles) of 4-aminophenol, 415.3 g (2.5 moles) of isophthalic acid and 1123 g (11 moles) of acetic anhydride were fed. After the air in the reactor was sufficiently replaced with nitrogen gas, the temperature was raised up to 150° C. over 15 minutes under flow of the nitrogen gas. This temperature was then kept for 3 hours to allow reflux.

Thereafter, the temperature was raised up to 320° C. over 170 minutes while removing distilling by-product of acetic acid and unreacted acetic anhydride. The reaction was considered terminated at the time when a rise in torque was recognized, and the resultant product was taken out. The content of 4-aminophenol is 12 mol % of the total of the repeating units composing the obtained liquid-crystalline polyester. The resultant resin exhibited a schlieren pattern specific to the liquid crystal phase at 200° C. when observed with a polarizing microscope.

Production Example 2

In a reactor equipped with a stirrer, a torque meter, a nitrogen gas feed tube, a thermometer and a reflux condenser 690 g (5.0 moles) of p-hydroxybenzoic acid, 273 g (2.5 moles) of 4-aminophenol, 415.3 g (2.5 moles) of isophthalic acid and 1123 g (11 moles) of acetic anhydride were fed. After the air in the reactor was sufficiently replaced with nitrogen gas, the temperature was raised up to 150° C. over 15 minutes under flow of the nitrogen gas. This temperature was then kept for 3 hours to allow reflux.

Thereafter, the temperature was raised up to 320° C. over 170 minutes while removing distilling by-product of acetic acid and unreacted acetic anhydride. The reaction was considered terminated at the time when a rise in torque was recognized, and the resultant product was taken out. The resultant resin exhibited a schlieren pattern specific to the liquid crystal phase at 200° C. when observed with a polarizing microscope.

Production Example 3

In a reactor equipped with a stirrer, a torque meter, a nitrogen gas feed tube, a thermometer and a reflux condenser, 191.8 g (1.02 moles) of 2-hydroxy-6-naphthoic acid, 63.3 g (0.34 moles) of 4,4'-dihydroxybiphenyl, 56.5 g (0.34 moles) of isophthalic acid and 191 g (1.87 moles) of acetic anhydride were fed. After the air in the reactor was sufficiently replaced with nitrogen gas, the temperature was raised up to 150° C. over 15 minutes under flow of the nitrogen gas. This temperature was then kept for 3 hours to allow reflux.

Thereafter, the temperature was raised up to 320° C. over 170 minutes while removing distilling by-product of acetic acid and unreacted acetic anhydride. The reaction was considered terminated at the time when a rise in torque was recognized, and the resultant product was taken out. The resultant resin exhibited a schlieren pattern specific to the liquid crystal phase at 250° C. when observed with a polarizing microscope.

Production Example 4

In a reactor equipped with a stirrer, a torque meter, a nitrogen gas feed tube, a thermometer and a reflux condenser 140.8 g (1.02 moles) of p-hydroxybenzoic acid, 63.3 g (0.34 moles) of 4,4'-dihydroxybiphenyl, 56.5 g (0.34 moles) of isophthalic acid and 191 g (1.87 moles) of acetic anhydride were fed. After the air in the reactor was sufficiently replaced with nitrogen gas, the temperature was raised up to 150° C. over 15 minutes under flow of the nitrogen gas. The temperature was then kept for 3 hours to allow reflux.

Thereafter, the temperature was raised up to 320° C. over 170 minutes while removing distilling by-product of acetic acid and unreacted acetic anhydride. The reaction was considered terminated at the time when a rise in torque was recognized, and the resultant product was taken out. The resultant solid content was cooled to room temperature, crushed with a coarse crusher, and left at 250° C. in the nitrogen atmosphere for 10 hours to allow development of polymerization in the solid state. The resultant resin exhibited a schlieren pattern specific to the liquid crystal phase at 200° C. when observed with a polarizing microscope.

Example 1

0.5 g of the aromatic liquid-crystalline polyester powder obtained in Production Example 1, was added to 9.5 g of N-methylpyrrolidone and heated to 120° C. As a result, it was confirmed that the powder was completely dissolved to provide a transparent solution. The solution was stirred and defoamed to obtain an aromatic liquid-crystalline polyester solution. The resultant solution was applied to copper foil by bar coating and subjected to heat treatment at 100° C. for one hour and at 250° C. for one hour, to thereby obtain a film with copper foil attached.

Example 2

0.5 g of the aromatic liquid-crystalline polyester powder obtained in Production Example 2, was added to 9.5 g of N-methylpyrrolidone and heated to 120° C. As a result, it was confirmed that the powder was completely dissolved to provide a transparent solution. The solution was stirred and defoamed to obtain an aromatic liquid-crystalline polyester solution. The resultant solution was applied to copper foil by bar coating and subjected to heat treatment at 100° C. for one hour and at 250° C. for one hour, to thereby obtain a film with copper foil attached.

Comparative Example 1

0.5 g of the aromatic liquid-crystalline polyester powder obtained in Production Example 3, was added to 9.5 g of N-methylpyrrolidone and heated to 120° C. As a result, it was found that the powder was not dissolved at all.

Comparative Example 2

0.5 g of the aromatic liquid-crystalline polyester powder obtained in Production Example 4, was added to 9.5 g of N-methylpyrrolidone and heated to 120° C. As a result, it was found that the powder was not dissolved at all.

According to the present invention, it is possible to provide a liquid-crystalline polyester solution composition that is low corrosive, easy in handling and provides a film of a liquid-crystalline polyester that is less anisotropic in mechanical strength.

What is claimed is:

1. A method for producing a liquid-crystalline polyester solution composition comprising an aprotic solvent and a liquid-crystalline polyester comprising:

at least one of the repeating units selected from the group consisting of a repeating unit derived from aromatic diamine, a repeating unit derived from aromatic amine having a hydroxyl group, and a repeating unit derived from aromatic amino acid, wherein the at least one of the repeating units is from 10 to 35 mol % in the liquid-crystalline polyester, and at least one of the repeating units represented by formulae (1), (2) and (3):

$$—O—Ar_1—CO— \quad (1)$$

$$—CO—Ar_2—CO— \quad (2)$$

$$—X—Ar_3—Y \quad (3)$$

wherein $Ar_1$ represents 1,4-phenylene, 2,6-naphthalene or 4,4'-biphenylene, $Ar_2$ represents 1,4-phenylene 1,3-phenylene or 2,6-naphthalene, $Ar_3$ represents 1,4-phenylene of 1,3-phenylene, X represents —NH—, and Y represents —O— or —NH—, wherein the content of the repeating units represented by formulae (1), (2) and (3) is 30 to 80 mol %, 35 to 10 mol % and 35 to 10 mol %, respectively, in the liquid crystalline polyester and the method comprising the steps of:

acylating at least one repeating unit selected from the group consisting of a hydroxycarboxylic acid providing the repeating unit represented by formula (1), an aromatic diamine, an aromatic amine having a hydroxyl group, an aromatic acid, and a repeating unit represented by formula (3) with an excess amount of a fatty acid anhydride to obtain an acylated compound, transesterification of the acylated compound and an aromatic dicarboxylic acid providing the repeating unit represented by formula (2) to obtain a liquid-crystalline polyester;

dissolving the polyester in an aprotic solvent to obtain a liquid-crystalline polyester solution composition thereof.

2. The method according to claim 1, wherein the amount of the liquid-crystalline polyester is from 0.01 to 100 parts by weight with respect to 100 parts by weight of the aprotic solvent.

3. The method according to claim 1, wherein the aprotic solvent is an aprotic solvent free from halogen atoms.

4. The method according to claims 1, wherein the aprotic solvent is an aprotic solvent having a dipole moment of from 3 to 5.

5. The method according to claim 4, wherein the aprotic solvent having a dipole moment of from 3 to 5 is an amide solvents or lactone solvents.

6. The method according to claim 5, wherein the amide solvent is one selected from the group consisting of N,N'-dimethyl formamide, N,N'-dimethyl acetoamide, and N-methylpyrrolidone.

7. The method according to claim 1, wherein $Ar_1$ is 2,6-naphthalene, $Ar_2$ is 1,3-phenylene, $Ar_3$ is 1,4-phenylene, X is —NH—, and Y is —O—.

8. A method for producing a liquid-crystalline polyester film comprising spreading a liquid-crystalline polyester solution composition over a support, and removing the solvent, wherein the liquid-crystalline polyester solution composition comprises an aprotic solvent and a liquid-crystalline polyester comprising:

at least one of the repeating units selected from the group consisting of a repeating unit derived from aromatic diamine, a repeating unit derived from aromatic amine having a hydroxyl group, and a repeating unit derived from aromatic amino acid, wherein the at least one of the repeating units is from 10 to 35 mol % in the liquid-crystalline polyester, and at least one of the repeating units represented by formulae (1), (2) and (3):

$$—O—Ar_1—CO— \quad (1)$$

$$—CO—Ar_2—CO— \quad (2)$$

$$—X—Ar_3—Y \quad (3)$$

wherein $Ar_1$ represents 1,4-phenylene, 2,6-naphthalene or 4,4'-biphenylene, $Ar_2$ represents 1,4-phenylene, 1,3-phenylene or 2,6-naphthalene, $Ar_3$ represents 1,4-phenylene or 1,3-phenylene, X represents —NH—, and Y represents —O— or —NH—, wherein the content of the repeating units represented by formulae (1), (2) and (3) is 30 to 80 mol %, 35 to 10 mol % and 35 to 10 mol %, respectively, in the liquid crystalline polyester.

9. A liquid-crystalline polyester film produced by the method of claim 8.

* * * * *